US012620246B2

(12) United States Patent
Li

(10) Patent No.: US 12,620,246 B2
(45) Date of Patent: May 5, 2026

(54) RECOGNITION METHOD AND APPARATUS, AND ELECTRONIC DEVICE

(71) Applicant: VIVO MOBILE COMMUNICATION CO., LTD., Dongguan (CN)

(72) Inventor: Yimin Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 359 days.

(21) Appl. No.: 18/203,049

(22) Filed: May 29, 2023

(65) Prior Publication Data

US 2023/0306765 A1 Sep. 28, 2023

Related U.S. Application Data

(63) Continuation of application No. PCT/CN2021/132368, filed on Nov. 23, 2021.

(30) Foreign Application Priority Data

Nov. 27, 2020 (CN) .......................... 202011361267.5

(51) Int. Cl.
*G06V 30/14* (2022.01)
*H04N 23/67* (2023.01)
(52) U.S. Cl.
CPC ........... *G06V 30/141* (2022.01); *H04N 23/67* (2023.01)
(58) Field of Classification Search
CPC ...... G06V 30/141; G06V 10/25; G06V 10/74; G06V 30/10; H04N 23/67; H04N 23/71; H04N 23/75; H04N 23/60; H04N 23/73
USPC ........................................................ 382/284
See application file for complete search history.

(56) References Cited

U.S. PATENT DOCUMENTS

2005/0088460 A1* 4/2005 Ouchi .................. H04N 23/634
345/672
2010/0155485 A1 6/2010 Tan et al.

FOREIGN PATENT DOCUMENTS

| CN | 101882308 A | 11/2010 |
| CN | 102354363 A | 2/2012 |
| CN | 105404838 A | 3/2016 |
| CN | 105411523 A | 3/2016 |
| CN | 107292820 A | 10/2017 |
| CN | 108399540 A | 8/2018 |
| CN | 108629220 A | 10/2018 |
| CN | 108763998 A | 11/2018 |

(Continued)

OTHER PUBLICATIONS

International Search Report issued in corresponding International Application No. PCT/CN2021/132368, mailed Feb. 17, 2022, 4 pages.

(Continued)

*Primary Examiner* — Stephen P Coleman
(74) *Attorney, Agent, or Firm* — IPX PLLC

(57) ABSTRACT

A recognition method and apparatus, and an electronic device are provided. The recognition method includes: adjusting shooting parameters of a camera in a case that a collected first image includes a light reflecting region, where the shooting parameters include at least one of an aperture and a focus; collecting a second image according to adjusted shooting parameters; and recognizing the target image to obtain a corresponding recognition result, where the target image includes the second image, or the target image is obtained based on the first image and the second image.

15 Claims, 6 Drawing Sheets

(56)                     References Cited

FOREIGN PATENT DOCUMENTS

| | | | |
|----|------------|---|---------|
| CN | 109257540  | A | 1/2019  |
| CN | 109598515  | A | 4/2019  |
| CN | 110008943  | A | 7/2019  |
| CN | 111510623  | A | 8/2020  |
| CN | 111681160  | A | 9/2020  |
| CN | 112532884  | A | 3/2021  |
| JP | 2005295313 | A | 10/2005 |

OTHER PUBLICATIONS

First Office Action issued in related Chinese Application No. 202011361267.5, mailed Oct. 13, 2021, 8 pages.
Second Office Action issued in related Chinese Application No. 202011361267.5, mailed Apr. 21, 2022, 6 pages.

* cited by examiner ags
gsf
gsg

22

RECOGNITION METHOD AND APPARATUS, AND ELECTRONIC DEVICE

CROSS-REFERENCE TO RELATED APPLICATIONS

This application is a continuation of International Application No. PCT/CN2021/132368, filed on Nov. 23, 2021, which claims priority to Chinese Patent Application No. 202011361267.5, filed on Nov. 27, 2020. The entire contents of each of the above-identified applications are expressly incorporated herein by reference.

TECHNICAL FIELD

This application belongs to the field of communication technologies, and specifically relates to a recognition method and apparatus, and an electronic device.

BACKGROUND

Currently, in a process of converting physical documents such as some prints into electronic documents, scanning recognition is generally adopted to improve efficiency of document conversion. However, in some special scanning scenarios, scanned images of scanned documents include light reflecting regions, resulting in unclear parts in recognition results due to the presence of light reflecting regions in the process of recognizing the scanned images.

It can be seen that there is a problem of poor recognition of content of images that includes light reflecting regions.

SUMMARY

A recognition method and apparatus, and an electronic device are provided.

According to a first aspect, the embodiments of this application provide a recognition method, including.

adjusting shooting parameters of a camera in a case that a collected first image includes a light reflecting region, where the shooting parameters include at least one of an aperture and a focus;

collecting a second image according to adjusted shooting parameters; and recognizing the target image to obtain a corresponding recognition result, where the target image includes the second image, or the target image is obtained based on the first image and the second image.

According to a second aspect, the embodiments of this application provide a recognition apparatus, including:

an adjustment module, configured to adjust shooting parameters of a camera in a case that a collected first image includes a light reflecting region, where the shooting parameters include at least one of an aperture and a focus;

a collecting module, configured to collect a second image according to adjusted shooting parameters; and a recognition module, configured to recognize the target image to obtain a corresponding recognition result, where the target image includes the second image, or the target image is obtained based on the first image and the second image.

According to a third aspect, the embodiments of this application provide an electronic device including a processor, a memory, and a program or instructions stored in the memory and runnable on the processor, the program or instructions, when being executed by the processor, implementing the steps of the method according to the first aspect.

According to a fourth aspect, the embodiments of this application provide a readable storage medium storing a program or instructions, the program or instructions, when being executed by a processor, implementing the steps of the method according to the first aspect.

According to a fifth aspect, the embodiments of this application provide a chip, including a processor and a communication interface, where the communication interface is coupled to the processor, and the processor is configured to run a program or instructions to implement the method according to the first aspect.

According to a sixth aspect, the embodiments of this application provide a program product stored in a non-volatile storage medium, and the program product is executed by at least one processor to implement the steps of the method according to the first aspect.

According to a seventh aspect, the embodiments of this application provide a communication device configured to perform the steps of the method according to the first aspect.

In the embodiments of this application, in a case that the collected first image includes the light reflecting region, the shooting parameters may be adjusted to remove or reduce light reflection of feature information corresponding to the light reflecting region, to collect a corresponding second image.

DETAILED DESCRIPTION

The following describes the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the specification and claims of this application, terms such as "first" and "second" are used to distinguish similar objects, but are not used to describe a specific sequence or order. It should be understood that the terms so used may be interchanged in an appropriate condition, so that the embodiments of this application described herein can be implemented in an order other than those illustrated or described herein. In addition, the objects distinguished by "first," "second," and the like are generally one type, and a number of objects is not limited, for example, a number of first object may be one, or may be more than one. In addition, "and/or" used in the specification and claims represents at least one of connected objects, and the character "/" generally indicates an "or" relationship between the associated objects.

The recognition method provided in the embodiments of this application is described in detail below with reference to the accompanying drawings by using specific embodiments and the application scenario.

Figure 1:
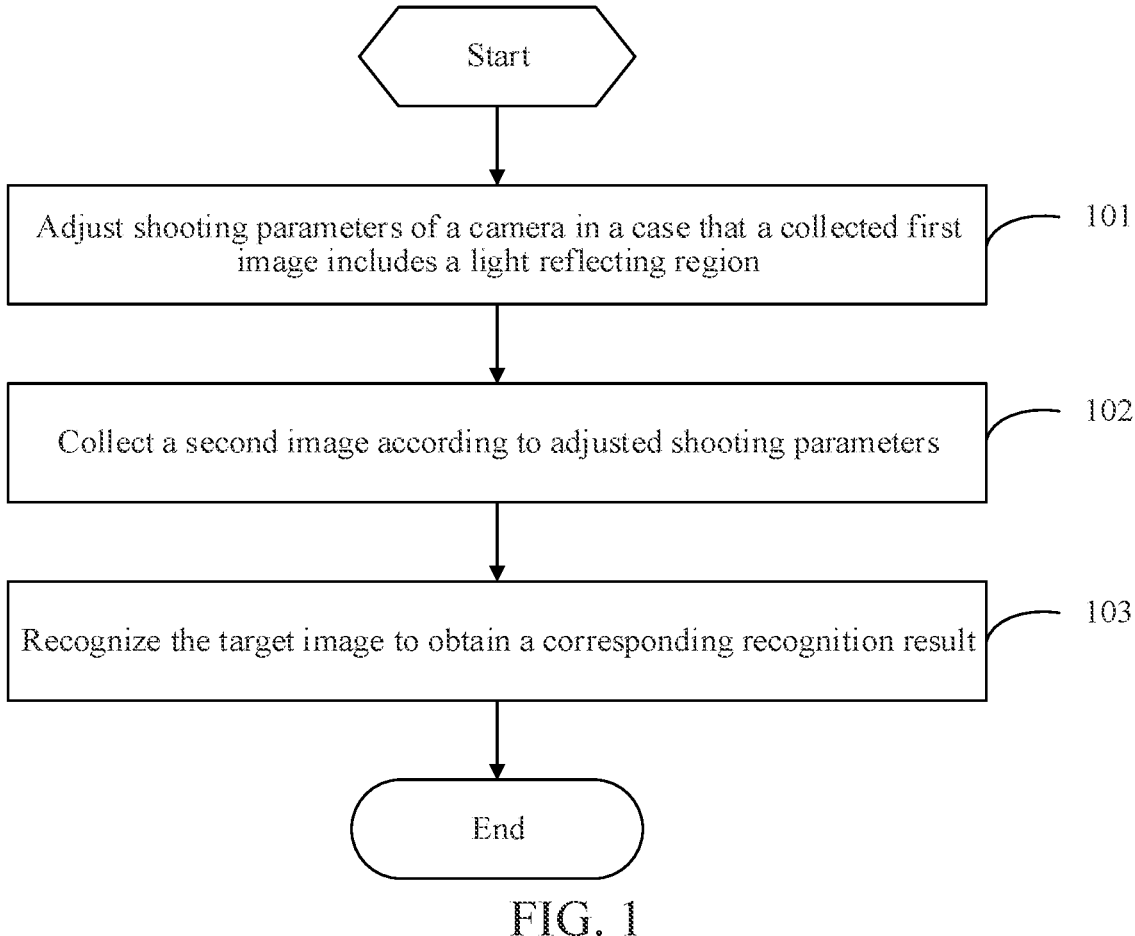
FIG. 1 is a flowchart of a recognition method provided in an embodiment of the present application.

FIG. 1 is a flowchart of a recognition method provided in an embodiment of the present application. The recognition method provided in the embodiments of this application can be applied to an electronic device including a camera. As shown in FIG. 1, the recognition method includes the following steps.

Step 101: Adjust shooting parameters of a camera in a case that a collected first image includes a light reflecting region.

In this step, the shooting parameters include at least one of an aperture and a focus, that is, the aperture or the focus of the camera may be adjusted to remove or reduce light reflection to collect a corresponding image.

In a process of scanning and recognizing a target object, an image of the target object may be first acquired, and then content of the image is recognized; and if in a process of recognizing the content of the image, the light reflecting region is recognized in the image, step 101 is performed to collect the corresponding image.

In an embodiment, the target object may be a document, or may be a picture.

For example, in a case that the target object is a document, in a process of scanning and recognizing the document, a scanned image may be first acquired; and after collecting the scanned image of the document, the scanned image may be recognized through extracting features of a text region. The features of a text region include texture, a color difference, light, a color difference comparison feature, and the like of the scanned image.

In addition, in a process of extracting the features of the text region, key feature information may be extracted from a place at which a contour curvature of the scanned image is the largest or contour features are located, so as to determine whether the scanned image includes a light reflecting region or a curved region.

Further, a photo including a light reflecting region confirmed by a user may be collected as a reference object, key feature information of the scanned image is extracted, and the extracted key feature information is compared with key feature information of the reference object at a same position. Standardized key feature information is separately formed into a reference object feature vector a and an undetermined photo feature vector b, for calculating a similarity between the key feature information vectors a and b, for example, a similarity may be a two-norm of a and b, and if the similarity is in a specific threshold range, it is determined that the scanned image includes a light reflecting region.

In a case that it is determined that the scanned image includes a light reflecting region, shooting parameters of the camera may be adjusted to reduce or remove light reflection of the document, to collect a corresponding image.

Step 102: Collect a second image according to the adjusted shooting parameters.

In this step, the second image may be an image related to the light reflecting region. In other words, by adjusting the shooting parameters, light reflection of feature information corresponding to the light reflecting region is reduced or removed, to collect a corresponding second image.

For example, an image feature corresponding to a light reflecting region of the first image is a feature A, light reflection of the feature A of the target object may be reduced or removed by adjusting the shooting parameters, so that an image region corresponding to the feature A in a collected second image does not include light reflection.

Step 103: Recognize the target image to obtain a corresponding recognition result.

In this step, the target image includes the second image, or the target image is obtained based on the first image and the second image.

For a case that the target image includes the second image, that is, the second image may be an entire scanned image of the target object, and the second image does not include a light reflecting region. Therefore, the second image may be recognized to obtain the recognition result corresponding to the target object.

Further, for a case that the target image includes the first image and the second image, that is, the second image is only a partial scanned image of the target object, or even the second image may be only an image corresponding to an image feature related to the light reflecting region in the first image, content of the first image and content of the second image may be recognized respectively, synthesis processing is performed on the recognized content to obtain the recognition result corresponding to the target object.

In addition, for a case that the target object is obtained based on the first image and the second image, the first image and the second image may be first merged to obtain the target image, and then the target image is recognized to obtain the corresponding recognition result.

In this way, in a case that the collected first image includes a light reflecting region, the shooting parameters may be adjusted to remove or reduce light reflection of feature information corresponding to the light reflecting region, to collect the corresponding second image, thereby reducing an impact of the light reflecting region on the recognition result during image recognition and improving accuracy of the recognition result.

It should be noted that, the target object may also include another scanned image.

In some implementations, the another scanned image includes a scanned image including a curved region, and tiling processing may be performed on the scanned image including a curved region to recognize the scanned image including a curved region; alternatively, the another scanned image includes a scanned image including a blurry region, and deblurring processing may be performed on the scanned image including a blurry region to recognize the scanned image including a blurry region. Accuracy of a recognition result of the another scanned image can be improved.

In this way, in a process of obtaining the recognition result of the target object, merging processing may be performed on the recognition result corresponding to the target image and the recognition result corresponding to the another scanned image of the target object, to obtain the recognition result of the target object.

In a process of performing merging processing on the recognition result corresponding to the target image and the recognition result corresponding to the another scanned image of the target object, recognition content of a common region between the images may be used as a connection of merging, to improve accuracy of the merging processing, thereby improving accuracy of the recognition result.

In some implementations, the target image includes the first image and the second image, and the recognizing the target image to obtain a corresponding recognition result includes:

recognizing the first image to obtain a first recognition result;

recognizing the second image to obtain a second recognition result;

determining recognition content of a common region of the first image and the second image based on the first recognition result and the second recognition result; and performing merging processing on the first recognition result and the second recognition result based on the recognition content of the common region to obtain the recognition result corresponding to the target image.

In this implementation, recognition content of the common region may be used as connecting content between the first recognition result and the second recognition result, to improve the accuracy of the merging processing, thereby improving the accuracy of the recognition result.

For example, in a case that the target object is a document, in a process of recognizing the first image, character information in the first image may be recognized, and position information of each character may be recorded, to obtain the first recognition result; and correspondingly, character information in the second image may alternatively be recognized, and position information of each character may be recorded, to obtain the second recognition result.

Further, in some implementations, the determining recognition content of a common region of the first image and the second image based on the first recognition result and the second recognition result includes: obtaining character information and position information of a first character in the first recognition result; obtaining character information and position information of a second character in the second recognition result; and using the first character or the second character as the recognition content of the common region of the first image and the second image in a case that the character information and the position information of the first character are the same as the character information and the position information of the second character.

In an embodiment, the position information of a character may be determined by calculating a line number and coordinate information of the character.

In another embodiment, character information distributed in four squares above, below, on the left of, and on the right of each character may be recorded. One or more characters in each direction may be recorded, and a specific quantity may be adjusted according to an actual requirement, to ensure uniqueness of distribution of adjacent characters around the each character as much as possible, thereby ensuring accuracy of the position information of the character.

In this way, accuracy of the recognition content of the common region of the first image and the second image can be improved, thereby improving the accuracy of the merging processing.

In some implementations, the performing merging processing on the first recognition result and the second recognition result based on the recognition content of the common region to obtain the recognition result corresponding to the target image includes:

performing the merging processing on the first recognition result and the second recognition result based on the recognition content of the common region to obtain a merged recognition result;

obtaining first content associated with the first recognition result and second content associated with the second recognition result; and checking the merged recognition result based on the first content and the second content to obtain the recognition result corresponding to the target image.

In this implementation, for the recognition result, content associated with the recognition result may be obtained by using an online searching function, that is, content with a high similarity to the recognition result is obtained, and the merged recognition result may be checked by using the content, to avoid lack of the recognition result, thereby further improving the accuracy of the recognition result.

For example, in a case that there is an obvious error in the recognition result, or in a case that recognition fails because part of document content is missing due to shooting defects, first content and second content obtained by searching may be used to complement or replace the merged recognition result to improve integrity of the merged recognition result.

In some implementations, after the collecting a second image according to adjusted shooting parameters, and before the recognizing the target image to obtain a corresponding recognition result, the method further includes:

performing tiling processing on the second image in a case that the second image includes a curved region, where the target image includes the second image after the tiling processing, or the target image is obtained based on the first image and the second image after the tiling processing.

In this implementation, for a case that the second image includes a curved region, tiling processing may be performed on the second image, to reduce an impact of the curved region on the recognition result of the second image.

In a process of tiling processing, features of a curved surface of the curved region may be calculated and transformed during tiling processing with corresponding information being kept, to obtain an image feature after the tiling processing.

In addition, in a case that the second image further includes a blurry region, deblurring processing may be performed on the blurry region in the second image, to reduce an impact of the blurry region on the recognition result.

There are two general cases that an image is blurred, one is that the image is blurred due to shooting reasons, and the other is that the image is blurred after being enlarged. In this application, the blurry region is mainly caused by the shooting reasons. For the blurry region caused by the shooting reasons, the deblurring processing may be performed by smoothing and strengthening.

In an implementation of this application, for a case that the target object is a curved surface, a user may select a shooting policy to reduce an impact of the curved surface on the recognition result of the target object. In the following implementation, the target object is a document.

Figure 2A:
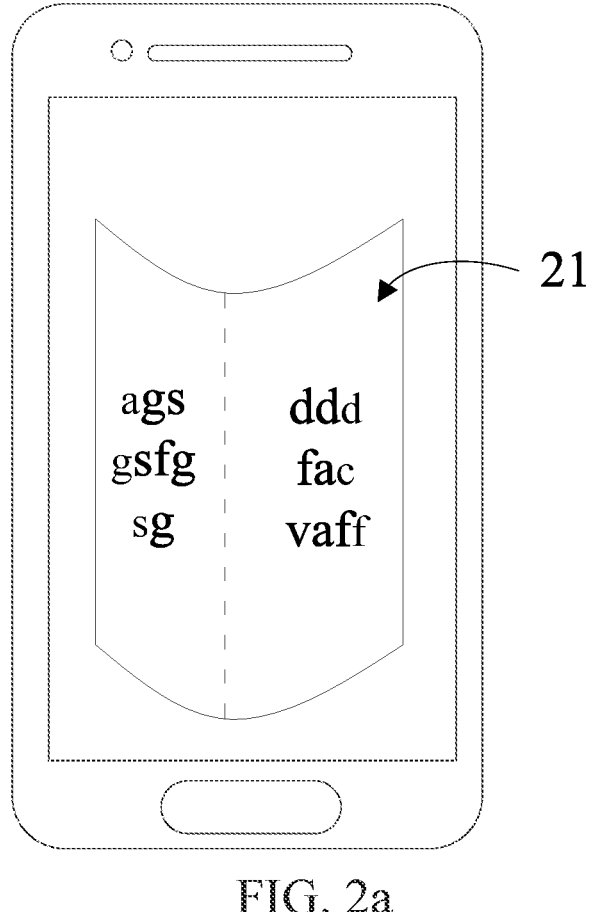
FIG. 2a is a schematic operation diagram 1 provided in an embodiment of the present application.
Figure 2B:
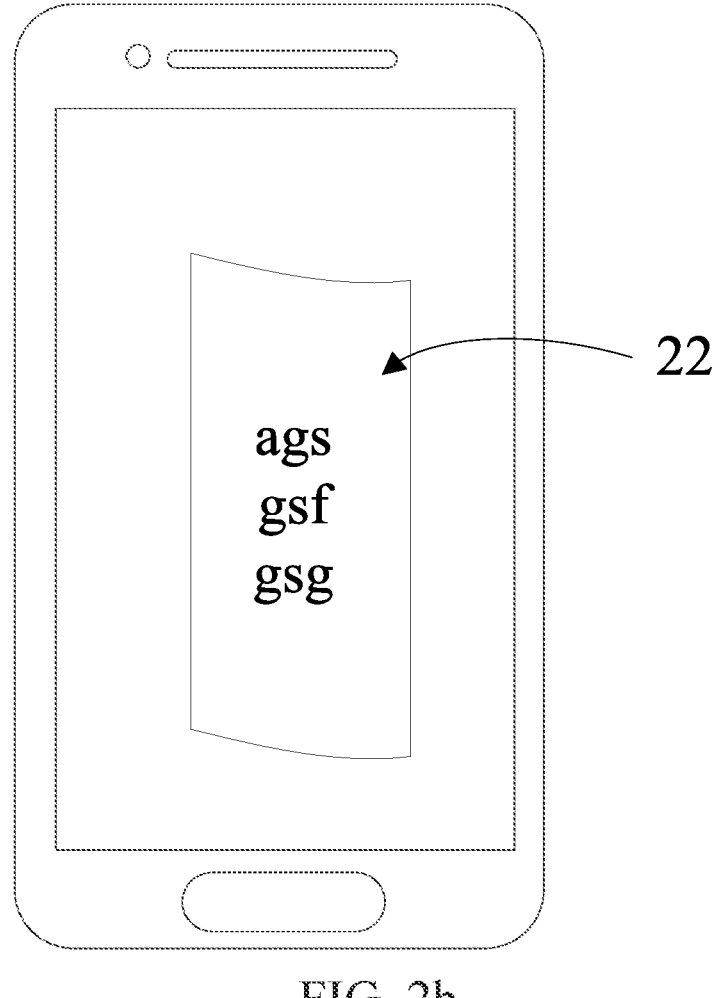
FIG. 2b is a schematic operation diagram 2 provided in an embodiment of the present application.
Figure 2C:
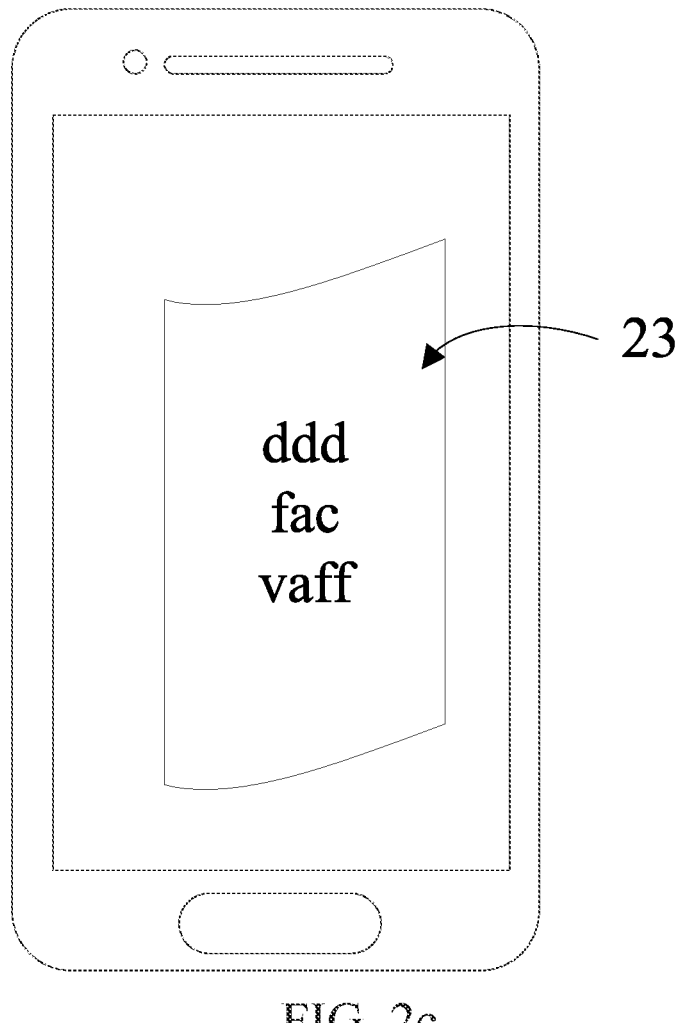
FIG. 2c is a schematic operation diagram 3 provided in an embodiment of the present application.

As shown in FIG. 2a, in a process of recognizing a target object 21 including a curved surface, an order of shooting angles may be selected to collect scanned images of the target object from left to right, for example, content of a left part of the target object may be first acquired, and a first scanned image 22 is obtained, as shown in FIG. 2b; and then content of a right part of the target object is acquired, and a second scanned image 23 is obtained, as shown in FIG. 2c.

Then the first scanned image 22 and the second scanned image 23 may be respectively recognized, and text information is extracted; and in a process of extracting the text information, in a case that any one of the first scanned image 22 and the second scanned image 23 includes a light reflecting region, steps 101 to 103 are performed to remove the impact of the light reflecting region on the recognition result.

In another implementation of this application, a part of the target object may be shot and recognized, or the target object is automatically divided into a plurality of objects according to a region position, and each object is separately determined and recognized. In addition, for the collected scanned image of the target object, the scanned image may be recognized and extracted, a clear region in the scanned image is recognized, and an unclear region is marked.

For recognition information of the recognized clear region, the recognition information may be first stored; the unclear region is marked and numbered; then the unclear region is re-shot to obtain a corresponding clear image; and in a process of re-shooting, a shooting region may be selected based on an output operation of the user, or may be automatically selected based on a mark and a number.

If the unclear region is a light reflecting region, an image feature corresponding to the light reflecting region is re-shot, and an image without light reflection is shot; if the unclear region is a curved region, tiling processing is performed on the curved region to reduce an impact of the curved region on the recognition result; or if the unclear region is a blurry region, deblurring processing may be performed on the blurry region to reduce an impact of the blurry region on the recognition result.

In addition, after the clear image of the unclear region is obtained, by recognizing content and based on the corresponding mark and number, merging and splicing processing may be performed on the clear image of the unclear region and the previously stored clear region, to obtain the recognition result of the target object and improve the accuracy of the recognition result.

In another implementation of this application, in a case that the first image includes a light reflecting region, the shooting parameters of the camera may be adjusted, for example, different parameters such as an aperture and a focus may be set, and a plurality of images may be shot and stored, so that there is at least one image without light reflection for each text region, to obtain the second image without light reflection.

In addition, if the user is not satisfied with an effect of de-reflection of the shot image, re-shooting may be performed, until obtaining a de-reflective image that the user is satisfied with.

According to the shooting method in the embodiment of this application, by adjusting shooting parameters of the camera in a case that the collected first image includes a light reflecting region, the shooting parameters include at least one of the aperture and the focus; collecting a second image according to adjusted shooting parameters; and recognizing the target image to obtain a corresponding recognition result, where the target image includes the second image, or the target image is obtained based on the first image and the second image. In this way, in a case that the collected first image includes a light reflecting region, the shooting parameters may be adjusted to remove or reduce light reflection of feature information corresponding to the light reflecting region, to collect the corresponding second image, thereby reducing an impact of the light reflecting region on the recognition result during image recognition and improving accuracy of the recognition result.

It should be noted that, the recognition method provided in the embodiment of this application may be performed by a recognition apparatus or a control module configured to perform the recognition method in the recognition apparatus. In the embodiment of this application, the recognition method being performed by the recognition apparatus is used as an example, to describe the recognition apparatus provided in the embodiment of this application.

Figure 3:
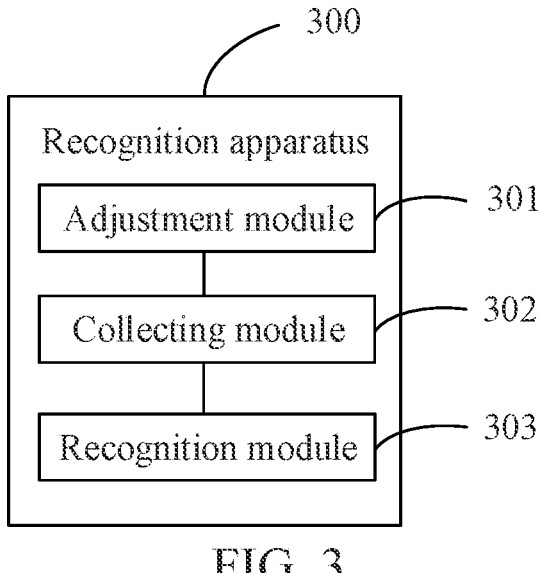
FIG. 3 is a structural diagram of a recognition apparatus provided in an embodiment of the present application.

FIG. 3 is a structural diagram of a recognition apparatus provided in an embodiment of the present application. As shown in FIG. 3, the recognition apparatus 300 includes:

an adjustment module 301, configured to adjust shooting parameters of a camera in a case that a collected first image includes a light reflecting region, where the shooting parameters include at least one of an aperture and a focus;

a collecting module 302, configured to collect a second image according to adjusted shooting parameters; and a recognition module 303, configured to recognize the target image to obtain a corresponding recognition result, where the target image includes the second image, or the target image is obtained based on the first image and the second image.

In some implementations, the target image includes the first image and the second image, and the recognition module 303 includes:

a first recognition unit, configured to recognize the first image to obtain a first recognition result;

a second recognition unit, configured to recognize the second image to obtain a second recognition result;

a determining unit, configured to determine recognition content of a common region of the first image and the second image based on the first recognition result and the second recognition result; and a merging unit, configured to perform merging processing on the first recognition result and the second recognition result based on the recognition content of the common region to obtain the recognition result corresponding to the target image.

In some implementations, the determining unit includes:

a first obtaining subunit, configured to obtain character information and position information of a first character in the first recognition result;

a second obtaining subunit, configured to obtain character information and position information of a second character in the second recognition result; and a determining subunit, configured to use the first character or the second character as the recognition content of the common region of the first image and the second image in a case that the character information and the position information of the first character are the same as the character information and the position information of the second character.

In some implementations, the merging unit includes:

a merging subunit, configured to perform the merging processing on the first recognition result and the second recognition result based on the recognition content of the common region to obtain a merged recognition result;

a third obtaining subunit, configured to obtain first content associated with the first recognition result and second content associated with the second recognition result; and a checking subunit, configured to check the merged recognition result based on the first content and the second content to obtain the recognition result corresponding to the target image.

In some implementations, the recognition apparatus 300 further includes:

a tiling module, configured to perform tiling processing on the second image in a case that the second image includes a curved region, where the target image includes the second image after the tiling processing, or the target image is obtained based on the first image and the second image after the tiling processing.

The recognition apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA); and the non-mobile electronic device may be a Network Attached Storage (NAS), a personal computer, a television, a teller machine, or an automated machine, which is not specifically limited in the embodiments of this application.

The recognition apparatus in the embodiments of this application may be an apparatus with an operating system. The operating system may be an Android operating system, may be an iOS operating system, or may be another possible operating system, and is not specifically limited in the embodiments of this application.

The recognition apparatus provided in the embodiments of this application can implement processes implemented in the method embodiment of FIG. 1. To avoid repetition, details are not described herein again.

Figure 4:
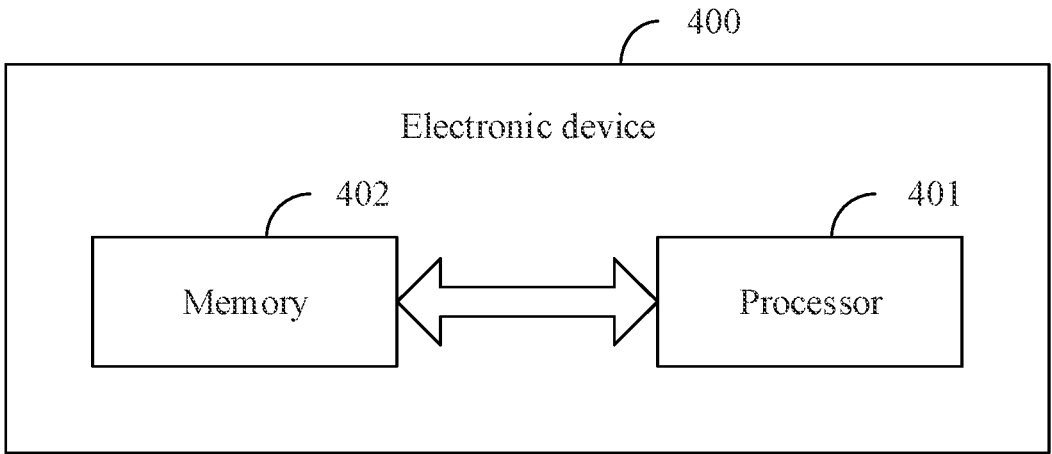
FIG. 4 is a structural diagram of an electronic device provided in an embodiment of the present application.

In some implementations, as shown in FIG. 4, the embodiments of this application further provide an electronic device 400, including a processor 401, a memory 402, a program or instructions stored in the memory 402 and runnable on the processor 401, the program or the instructions, when executed by the processor 401, implementing the processes of the foregoing recognition method embodiment and achieving the same technical effects. To avoid repetition, details are not described herein again.

It should be noted that, the electronic device in the embodiments of this application includes the mobile electronic device and the non-mobile electronic device.

Figure 5:
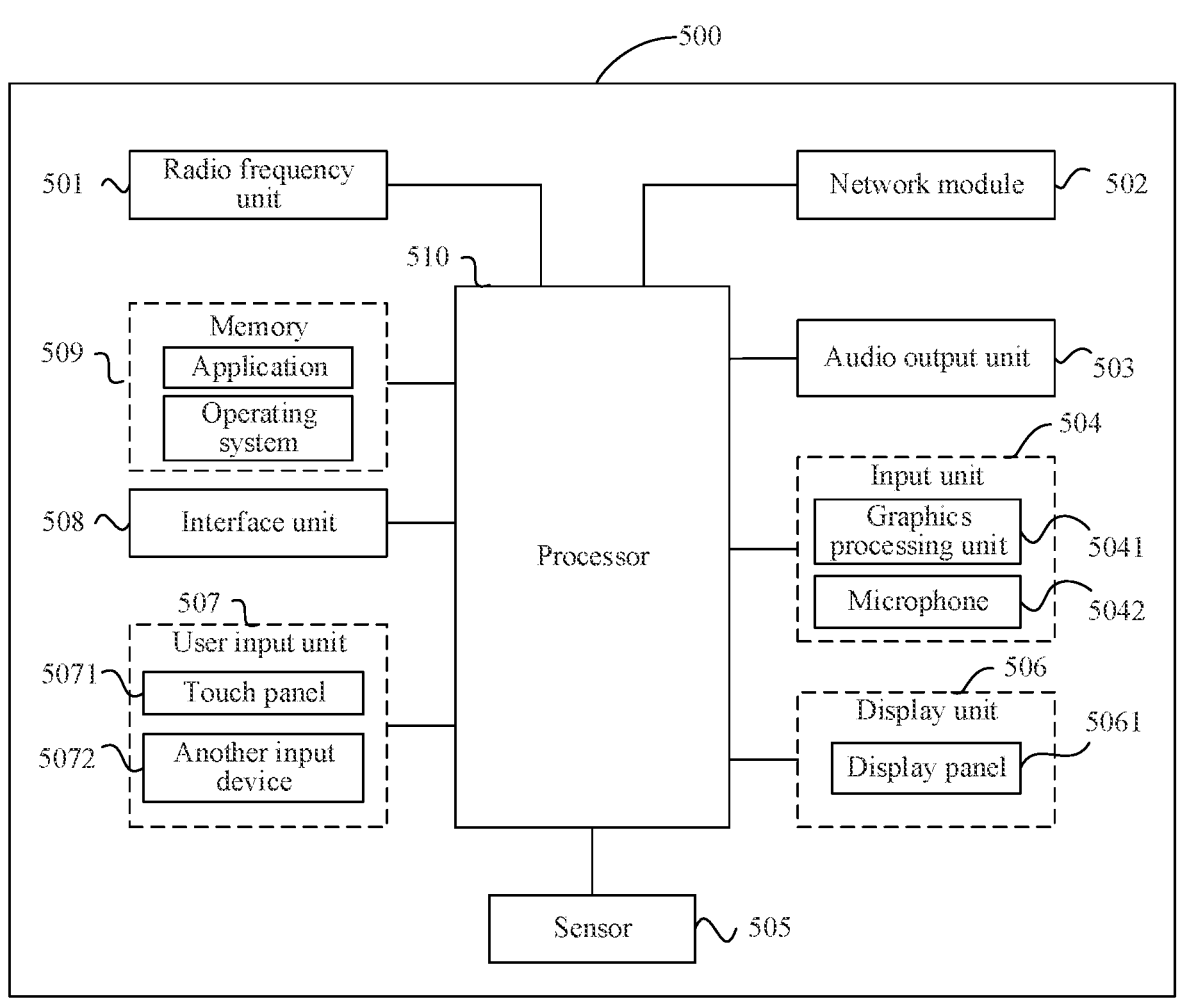
FIG. 5 is a structural diagram of an electronic device provided in an embodiment of the present application.

FIG. 5 is a structural diagram of an electronic device provided in an embodiment of the present application. As shown in FIG. 5, the electronic device 500 includes, but is not limited to, components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that, the electronic device 500 may further include a power supply (such as a battery) for supplying power to the components. The power supply may be logically connected to the processor 510 by using a power supply management system, thereby implementing functions, such as management of charging, discharging, and power consumption, by using the power supply management system. The electronic device structure shown in FIG. 5 constitutes no limitation on the electron device, and the electronic device may include more or fewer components than those shown in the figure, or some components may be combined, or a different component deployment may be used. Details are not described herein again.

The processor 510 is configured to adjust shooting parameters of a camera in a case that a collected first image includes a light reflecting region, where the shooting parameters include at least one of an aperture and a focus; the input unit 504 is configured to collect a second image according to adjusted shooting parameters; and the processor 510 is configured to recognize the target image to obtain a corresponding recognition result, where the target image includes the second image, or the target image is obtained based on the first image and the second image.

In some implementations, the target image includes the first image and the second image, and the processor 510 is configured to recognize the first image to obtain a first recognition result; the processor 510 is configured to recognize the second image to obtain a second recognition result; the processor 510 is configured to determine recognition content of a common region of the first image and the second image based on the first recognition result and the second recognition result; and the processor 510 is configured to perform merging processing on the first recognition result and the second recognition result based on the recognition content of the common region to obtain a recognition result corresponding to the target image.

In some implementations, the processor 510 is configured to obtain character information and position information of a first character in the first recognition result; the processor 510 is configured to obtain character information and position information of a second character in the second recognition result; and the processor 510 is configured to use the first character or the second character as the recognition content of the common region of the first image and the second image in a case that the character information and the position information of the first character are the same as the character information and the position information of the second character.

In some implementations, the processor 510 is configured to perform the merging processing on the first recognition result and the second recognition result based on the recognition content of the common region to obtain a merged recognition result; the processor 510 is configured to obtain first content associated with the first recognition result and second content associated with the second recognition result; and the processor 510 is configured to check a merged recognition result based on the first content and the second content to obtain the recognition result corresponding to the target image.

In some implementations, the processor 510 is configured to perform tiling processing on the second image in a case that the second image includes a curved region, where the target image includes the second image after the tiling processing, or the target image is obtained based on the first image and the second image after the tiling processing.

It should be understood that, in the embodiments of this application, the input unit 504 may include a Graphics Processing Unit (GPU) 5041 and a microphone 5042, and the graphics processing unit 5041 processes image data of still images or videos obtained by an image capture device (for example, a camera) in a video capture mode or an image capture mode. The display unit 506 may include a display panel 5061, for example, the display panel 5061 may be configured in a form such as a liquid crystal display or an organic light-emitting diode. The user input unit 507 includes a touch panel 5071 and another input device 5072. The touch panel 5071 is also referred to as a touch screen. The touch panel 5071 may include two parts: a touch detection apparatus and a touch controller. The another input device 5072 may include, but is not limited to, a physical keyboard, a functional key (such as a volume control key or a switch key), a track ball, a mouse, and a joystick, and details are not described herein again. The memory 509 may be configured to store software programs and various pieces of data, which includes, but is not limited to, an application and an operating system. The processor 510 may integrate an application processor and a modem. The application processor mainly processes an operating system, a user interface, an application, and the like. The modem mainly processes wireless communication. It may be understood that, the modem may not be integrated into the processor 510.

The embodiments of this application further provide a computer-readable storage medium, storing a program or instructions, the program or the instructions, when executed by a processor, implementing the processes of the foregoing recognition method embodiments and achieving the same technical effects. To avoid repetition, details are not described herein again.

The processor is the processor in the electronic device described in the foregoing embodiment. The readable storage medium includes a computer-readable storage medium, for example, a Read-Only Memory (ROM), a Random Access Memory (RAM), a magnetic disk, or an optical disc.

The embodiments of this application also provide a chip, including a processor and a communication interface. The communication interface is coupled to the processor, and the processor is configured to run a program or instructions, to implement the processes of the foregoing recognition method embodiment and achieve the same technical effects. To avoid repetition, details are not described herein again.

It should be understood that, the chip mentioned in the embodiments of this application may also be referred to as a system-level chip, a system chip, a chip system, a system on chip, or the like.

The embodiments of this application provide a computer program product, stored in a non-volatile storage medium, and the program product is executed by at least one processor to implement the processes of the foregoing method embodiments and achieve the same technical effects. To avoid repetition, details are not described herein again.

The embodiments of this application provide a communication device, configured to perform the processes of the foregoing method embodiments and achieve the same technical effects. To avoid repetition, details are not described herein again.

It should be noted that, terms "comprise," "include," or any variants thereof are intended to cover a non-exclusive inclusion. Therefore, a process, method, object, or device that includes a series of elements not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses. In addition, it should be noted that, the scope of the methods and devices in the implementations of this application is not limited to performing functions in the order shown or discussed and may also include performing functions in a substantially simultaneous manner or in reverse order according to the related functions. For example, the described methods may be performed in an order different from that described, and various steps may also be added, omitted, or combined. In addition, features described with reference to certain examples may be combined in other examples.

Through the foregoing description on the implementations, a person skilled in the art may clearly learn that the foregoing embodiment methods may be implemented by using software in combination with a necessary universal hardware platform. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific implementations. The foregoing specific implementations are merely exemplary and not limitative. Those of ordinary skill in the art may make various forms under the teaching of this application without departing from the spirit of this application and the protection scope of the claims, all of which fall within the scope of this application.

What is claimed is:

1. A recognition method, performed by an electronic device comprising a camera, comprising:

shooting, by the camera, a first image of a target object;

determining a clear region and an unclear region of the first image, the unclear region of the first image comprising a light reflecting region;

calculating new physical shooting parameters of the camera to remove or reduce light reflection of feature information corresponding to the light reflecting region, wherein the physical shooting parameters comprise at least one of an aperture or a focus of the camera;

reconfiguring the camera according to the new physical shooting parameters, and shooting, by the camera, a second image corresponding to the unclear region of the first image, wherein the second image has removed or reduced light reflection relative to the unclear region of the first image;

merging the second image with the first image to obtain a target image having removed or reduced light reflection of the feature information;

recognizing the target image to obtain a corresponding recognition result; and displaying the recognition result along with the target image on a display panel.

2. The method according to claim 1, wherein the target image comprises the first image and the second image, and the recognizing the target image to obtain a corresponding recognition result comprises:

recognizing the first image to obtain a first recognition result;

recognizing the second image to obtain a second recognition result;

determining recognition content of a common region of the first image and the second image based on the first recognition result and the second recognition result; and performing merging processing on the first recognition result and the second recognition result based on the recognition content of the common region to obtain the recognition result corresponding to the target image.

3. The method according to claim 2, wherein the determining recognition content of a common region of the first image and the second image based on the first recognition result and the second recognition result comprises:

obtaining character information and position information of a first character in the first recognition result;

obtaining character information and position information of a second character in the second recognition result; and using the first character or the second character as the recognition content of the common region of the first image and the second image when the character information and the position information of the first character are the same as the character information and the position information of the second character.

4. The method according to claim 2, wherein the performing merging processing on the first recognition result and the second recognition result based on the recognition content of the common region to obtain the recognition result corresponding to the target image comprises:

performing the merging processing on the first recognition result and the second recognition result based on the recognition content of the common region to obtain a merged recognition result;

obtaining first content associated with the first recognition result and second content associated with the second recognition result; and checking the merged recognition result based on the first content and the second content to obtain the recognition result corresponding to the target image.

5. The method according to claim 1, wherein after the shooting, by the camera, a second image corresponding to the unclear region of the first image, and before the recognizing the target image to obtain a corresponding recognition result, the method further comprises:

performing tiling processing on the second image when the second image comprises a curved region, wherein the target image comprises the second image after the tiling processing, or the target image is obtained based on the first image and the second image after the tiling processing.

6. An electronic device, comprising:

a camera;

a memory storing computer-readable instructions; and a processor coupled to the memory and configured to execute the computer-readable instructions, wherein the computer-readable instructions, when executed by the processor, cause the processor to perform operations comprising:

obtaining a first image of a target object shot by the camera;

determining a clear region and an unclear region of the first image, the unclear region of the first image comprising a light reflecting region;

calculating new physical shooting parameters of the camera to remove or reduce light reflection of feature information corresponding to the light reflecting region, wherein the physical shooting parameters comprise at least one of an aperture or a focus of the camera;

reconfiguring the camera according to the new physical shooting parameters, and obtaining a second image shot by the camera and corresponding to the unclear region of the first image, wherein the second image has removed or reduced light reflection relative to the unclear region of the first image;

merging the second image with the first image to obtain a target image having removed or reduced light reflection of the feature information;

recognizing the target image to obtain a corresponding recognition result; and displaying the recognition result along with the target image on a display panel.

7. The electronic device according to claim 6, wherein the target image comprises the first image and the second image, and the recognizing the target image to obtain a corresponding recognition result comprises:

recognizing the first image to obtain a first recognition result;

recognizing the second image to obtain a second recognition result;

determining recognition content of a common region of the first image and the second image based on the first recognition result and the second recognition result; and performing merging processing on the first recognition result and the second recognition result based on the recognition content of the common region to obtain the recognition result corresponding to the target image.

8. The electronic device according to claim 7, wherein the determining recognition content of a common region of the first image and the second image based on the first recognition result and the second recognition result comprises:

obtaining character information and position information of a first character in the first recognition result;

obtaining character information and position information of a second character in the second recognition result; and using the first character or the second character as the recognition content of the common region of the first image and the second image when the character information and the position information of the first character are the same as the character information and the position information of the second character.

9. The electronic device according to claim 7, wherein the performing merging processing on the first recognition result and the second recognition result based on the recognition content of the common region to obtain the recognition result corresponding to the target image comprises:

performing the merging processing on the first recognition result and the second recognition result based on the recognition content of the common region to obtain a merged recognition result;

obtaining first content associated with the first recognition result and second content associated with the second recognition result; and checking the merged recognition result based on the first content and the second content to obtain the recognition result corresponding to the target image.

10. The electronic device according to claim 6, wherein after the obtaining a second image shot by the camera and corresponding to the unclear region of the first image, and before the recognizing the target image to obtain a corresponding recognition result, the operations further comprise:

performing tiling processing on the second image when the second image comprises a curved region, wherein the target image comprises the second image after the tiling processing, or the target image is obtained based on the first image and the second image after the tiling processing.

11. A non-transitory computer-readable medium, storing instructions that, when executed by a processor of an electronic device comprising a camera, cause the processor to perform operations comprising:

obtaining a first image of a target object by the camera;

determining a clear region and an unclear region of the first image, the unclear region of the first image comprising a light reflecting region;

calculating new physical shooting parameters of the camera to remove or reduce light reflection of feature information corresponding to the light reflecting region, wherein the physical shooting parameters comprise at least one of an aperture or a focus of the camera;

reconfiguring the camera according to the new physical shooting parameters, and obtaining a second image shot by the camera and corresponding to the unclear region of the first image, wherein the second image has removed or reduced light reflection relative to the unclear region of the first image;

merging the second image with the first image to obtain a target image having removed or reduced light reflection of the feature information;

recognizing the target image to obtain a corresponding recognition result; and displaying the recognition result along with the target image on a display panel.

12. The non-transitory computer-readable medium according to claim 11, wherein the target image comprises the first image and the second image, and the recognizing the target image to obtain a corresponding recognition result comprises:

recognizing the first image to obtain a first recognition result;

recognizing the second image to obtain a second recognition result;

determining recognition content of a common region of the first image and the second image based on the first recognition result and the second recognition result; and performing merging processing on the first recognition result and the second recognition result based on the recognition content of the common region to obtain the recognition result corresponding to the target image.

13. The non-transitory computer-readable medium according to claim 12, wherein the determining recognition content of a common region of the first image and the second image based on the first recognition result and the second recognition result comprises:

obtaining character information and position information of a first character in the first recognition result;

obtaining character information and position information of a second character in the second recognition result; and using the first character or the second character as the recognition content of the common region of the first image and the second image when the character information and the position information of the first character are the same as the character information and the position information of the second character.

14. The non-transitory computer-readable medium according to claim 12, wherein the performing merging processing on the first recognition result and the second recognition result based on the recognition content of the common region to obtain the recognition result corresponding to the target image comprises:

performing the merging processing on the first recognition result and the second recognition result based on the recognition content of the common region to obtain a merged recognition result;

obtaining first content associated with the first recognition result and second content associated with the second recognition result; and checking the merged recognition result based on the first content and the second content to obtain the recognition result corresponding to the target image.

15. The non-transitory computer-readable medium according to claim 11, wherein after the obtaining a second image shot by the camera and corresponding to the unclear region of the first image, and before the recognizing the target image to obtain a corresponding recognition result, the operations further comprise:

performing tiling processing on the second image when the second image comprises a curved region, wherein the target image comprises the second image after the tiling processing, or the target image is obtained based on the first image and the second image after the tiling processing.

* * * * *